United States Patent

Saupe

[11] 4,035,920
[45] July 19, 1977

[54] DENTAL TEACHING DEVICE

[75] Inventor: Martin Saupe, Mittelbiberach, Germany

[73] Assignee: Kaltenbach & Voigt, Biberach, Rib, Germany

[21] Appl. No.: 703,505

[22] Filed: July 8, 1976

[30] Foreign Application Priority Data

July 14, 1975 Germany .............................. 2531436

[51] Int. Cl.² .......................................... A61C 19/00
[52] U.S. Cl. ...................................................... 32/71
[58] Field of Search ................ 35/17, 21; 32/71, 40 R

[56] References Cited
U.S. PATENT DOCUMENTS 1,166,796  1/1916  Weisse ..................................... 32/71

2,103,058  12/1937  Burtenshaw ............................ 32/71

Primary Examiner—Robert Peshock

[57] ABSTRACT

A dental teaching device has a dummy head displaceably mounted, within predetermined ranges of movement, on a holder so that the head can be adjusted to any desired position for a practice dental treatment. The holder has a curved socket in which a curved rear portion of the head is slidably received. The curved socket is shielded from exposure to contaminant material by the dummy head thereabove, for all positions of adjustment of the head relative to the holder. An opening in the curved rear portion of the head is defined by a rim which constitutes a limit stop engageable with a stop element secured to the holder and extending into the interior of the head through the opening.

11 Claims, 6 Drawing Figures

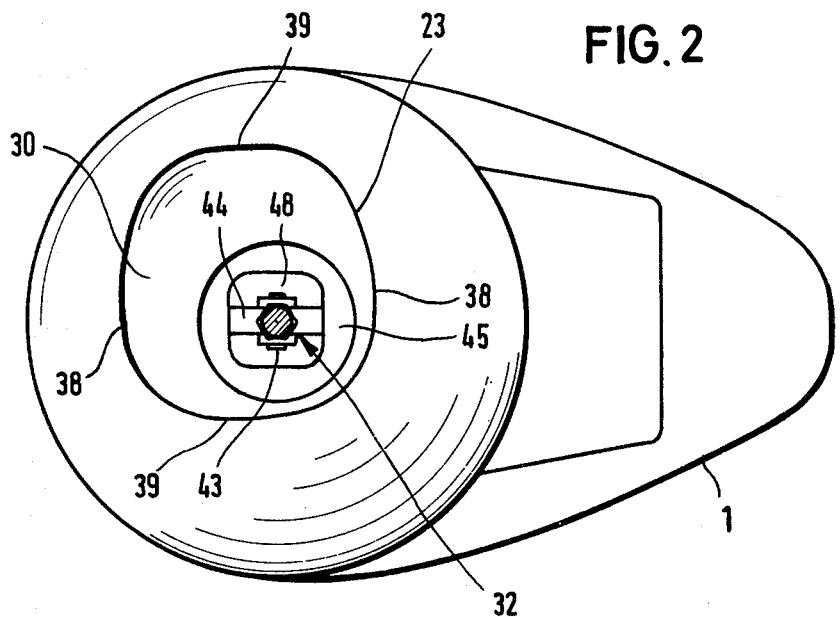
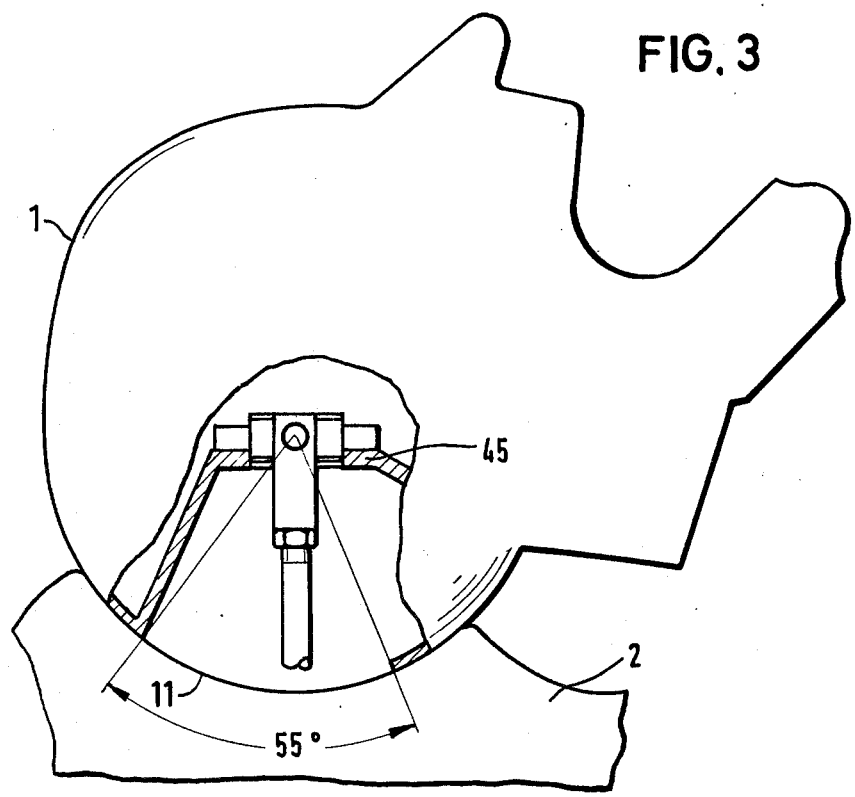

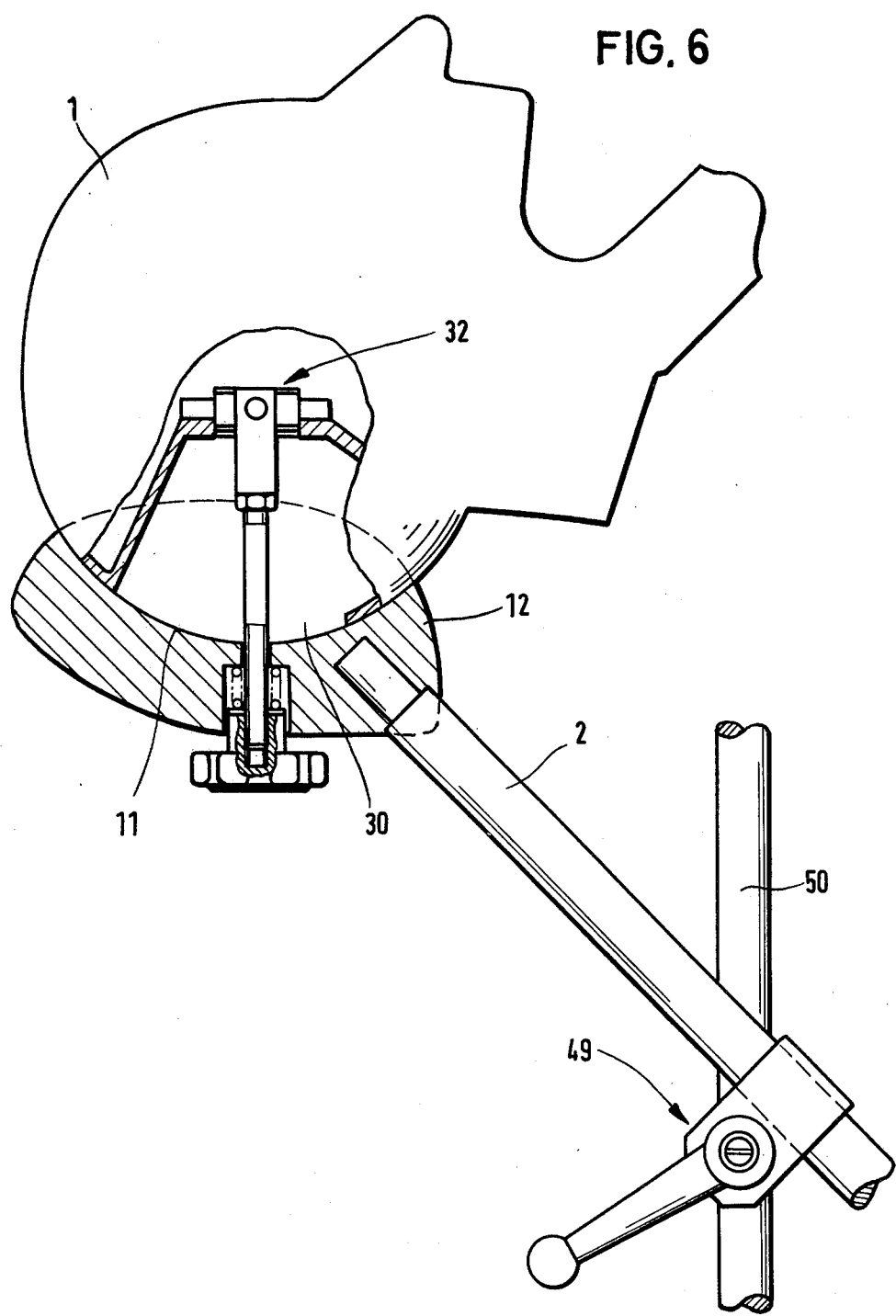

DENTAL TEACHING DEVICE

This invention relates to a dental teaching device comprising a holder, and a dummy head displaceably mounted on the holder whereby the head can be adjusted to any desired position for a practice dental treatment.

It is known from German Offenlegungsschrift No. 2,053,255 to mount the dummy head on the holder by means of a ball and socket-type joint arranged at a neck of the head. The socket serving for mounting the ball surrounds the greater part of the ball surface. However, in service, the portion of the ball surface not surrounded by the socket, and also the edge of the socket, are exposed to the deposition of contaminating substances, for example grinding or drilling dust or material for tooth fillings, whereby the desired displaceability of the head may be disturbed. If contaminating substances are deposited in the zone of the neck, it is no longer possible to pivot the head to achieve abutment of the neck at the edge of the socket, so that the range of movement of the head is restricted.

It is an object of the invention to provide a dental teaching device having an improved means for mounting the dummy head on the holder which is less susceptible to soiling by contaminants normally present during practice dental treatments.

According to one aspect the invention provides a dental teaching device comprising:
a dummy head;
a holder;
and means mounting the dummy head displaceably on the holder whereby the dummy head can be adjusted to any desired position relative to the holder;
wherein said means comprises a curved socket provided on said holder, and a curved rear portion of said dummy head, said rear portion engaging said curved socket so that adjustment of the relative position of the head on the holder can be carried out by relative sliding movement taking place between the curved socket and the curved rear portion;
and wherein the curved socket is covered by the dummy head for all relative positions of the dummy head on the holder.

According to a further aspect the invention provides a dental teaching device comprising:
a dummy head;
a holder;
a curved socket provided on the holder;
a curved rear portion of the dummy head in sliding engagement with said curved socket whereby the position of the head can be adjusted relative to the holder by carrying out sliding movement between the curved rear portion and the curved socket;
and mutually interengageable limit stops provided on the curved socket and the curved rear portion for limiting the extent of adjustable movement of the head with respect to the holder.

Due to the fact that only the curved rear portion of the dummy head, which is not exposed to the risk of soiling, is mounted in the curved socket, the risk of penetration of soiling elements into the bearing gap therebetween, and also the risk of deposition of soiling elements at the joint-gap edge, is to a considerable extent prevented.

Preferably, the device includes wall portions extending inwardly of said curved rear portion of the dummy head to define a passage therein, an outer rim of said portions defining an opening to said passage, and a stop element extending from said curved socket through said opening and into said passage, said rim and said stop element constituting said limit stops. Thereby, soiling elements are prevented substantially from reaching the edge of the opening formed in the rear portion of the head, and the stop element projecting into the said passage. Thereby the advantage is achieved that a substantially permanent, reliable delimiting can be obtained of the movements of the dummy head, for example tilting or rotating, so that for example due to suitable dimensioning of the rim of the opening predetermined zones or ranges of movement of the head can be delimited exactly and reliably.

In order reliably to prevent contaminating substances, for example dust, from passing through the passage into the interior of the head, which contaminating substances might under some circumstances be deposited at the rim of the opening and impair the accuracy of the delimiting effect of the rim, the rim of the aperture may be so dimensioned that the latter is covered by the socket in all possible settings of the head.

An especially good delimiting effect, due to exact mounting of the head in the socket, may be achieved if the stop element is designed as a connecting rod which projects into the passage and has a universal joint to which the dummy head is articulated.

In order that the mounting of the head in the socket can be fixed or released, it is preferred that the connecting rod is screwed into an adjusting or tightening nut rotatably mounted in the holder and bearing axially against an abutment, and which projects out of the holder in a direction away from the socket and is provided at the projecting end with a manipulating means.

Due to rotation of the manipulating means in one or the other direction, the head can, by means of the connecting rod acting as a pull rod, be secured more or less firmly in the socket. If a compression spring is arranged between the abutment and the tightening nut, the head is under predetermined pre-stress when the tightening nut is released, so that a student — to correspond to the conditions in the case of a human head — can displace, for example tilt or rotate, the head only on overcoming a resistance caused by the pre-stress. Additionally, in this manner, due to the compression spring and also with the tightening nut released, penetration of dust or other soiling elements into the bearing gap is prevented.

For limiting the movements of the head to correspond to the movement ranges of the human head (which experience shows are preferred by the dentist) it is preferred that the stop constituted by the rim of the opening and the stop element are so dimensioned and arranged that the maximum angle for movement of the head in the sense of a "nodding" movement is approximately 55°. Also, it is preferred that the stop constituted by the rim of the opening and the stop element are so dimensioned and arranged that the maximum angle for the movement of the head, in the sense of a lateral pivoting movement, is approximately 60°. It is especially expedient if the maximum angle for the movement of the head, in the sense of lateral pivoting from a normal median position corresponding to the "straight-ahead-viewing" position of a human head, is approximately 20° towards one side and approximately 40° towards the other side. If the student is right-handed, the maximum angle towards the right is 40° and towards the left it is 20°. If the student is left-handed, the maximum angle towards the right is 20° towards the left 40°. The angle of 40° offers the dentist (instructor) an adequate working range at the patient's mouth, whereas the angle of 20° provides the assistant with an adequate working range.

BRIEF DESCRIPTION OF THE DRAWINGS

FIG. 2 is an underneath plan view of the dummy head;

FIG. 3 is a side view, partly in section, of the dummy head;

FIG. 6 is a side view, partly in section, of a further arrangement of dummy head on a holder.

DESCRIPTION OF THE PREFERRED EMBODIMENTS

Figure 1:
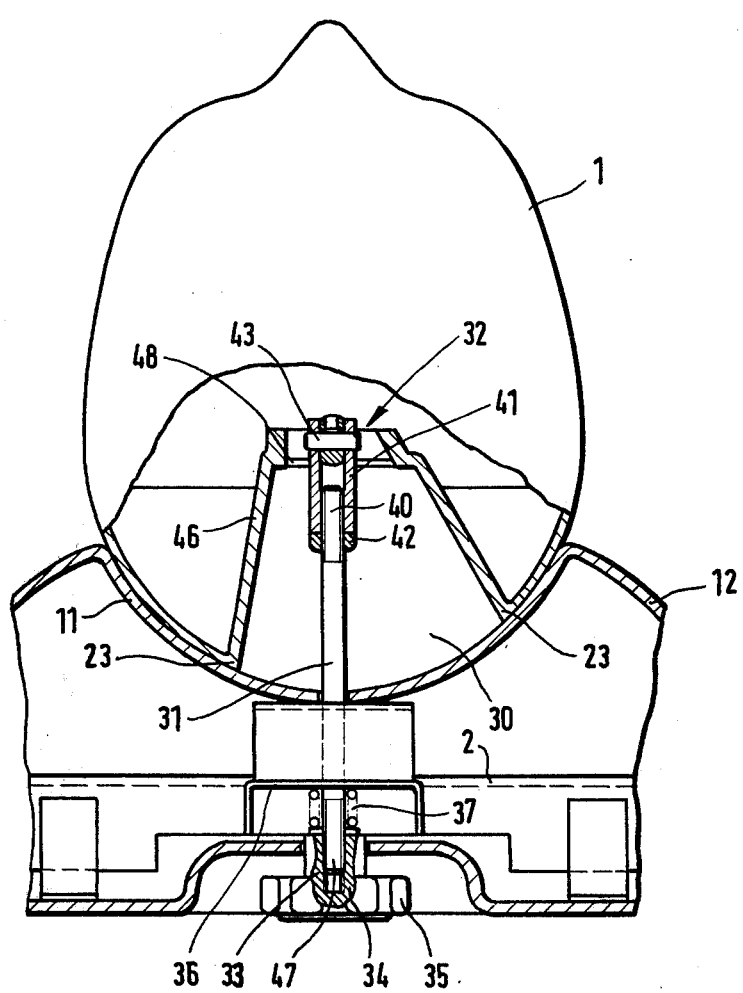
FIG. 1 is a plan view, partly in section, of a dummy head displaceably mounted on a holder.
Figure 5:
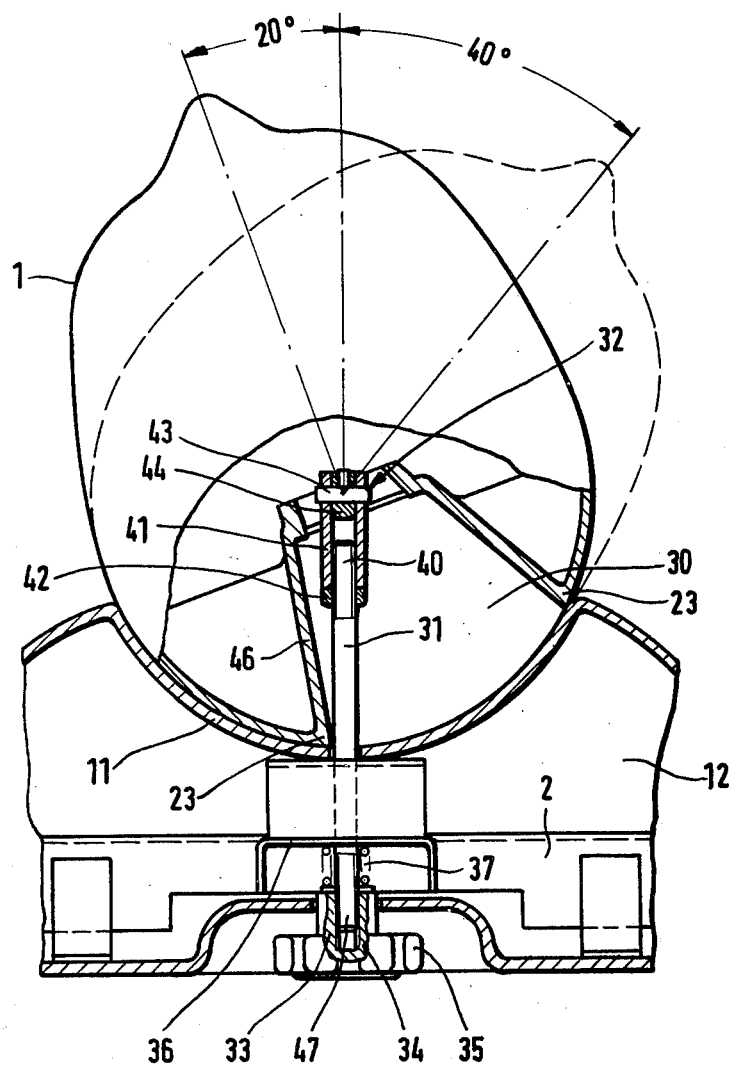
FIG. 5 illustrates the range of adjustment of the dummy head in the sense of lateral pivoting of the head.

A dummy head 1 is mounted, with its rear portion designed in the manner of a part-spherical or curved face, to be displaceable on all sides in a curved socket 11 which is provided in a holding device 2. Referring to FIGS. 1 and 5, the holding device 2 comprises for example a support component similar to or corresponding to a dental treatment chair backrest and adapted to be adjustable to correspond to the movements of the backrest in respect of inclination relative to the horizontal and also vertically, and on which, in the zone of the free end, a holding means 12 carrying the socket 11 is arranged. Referring to FIG. 6, the holding device 2 comprises a carrier rod at the free end of which the holding means 12 carrying the socket 11 is arranged. The carrier rod is mounted by means of a lockable pivot joint 49 on a bearing rod 50 or at a table, at a wall, at a device stand, or the like.

Mutually interengageable limit stops are provided on the curved socket and the curved rear portion for limiting the extent of adjustable movement of the head with respect to the holder. To this end, limit stops 23 are provided on the head 1 for limiting the movements thereof to correspond to natural head movements and are constituted by the rim of an opening to a passage 30 arranged in the zone of the rear portion of thead 1 (mounted in the socket 11). Into the passage 30 projects a stop element in the form of a counter-stop 31 extending from the bottom of the socket 11 into the head 1. As will be seen in the drawings, the rim defining the opening to passage 30 is so dimensioned that the latter is covered by the socket 11 in all possible settings of the head 1. Conversely, the curved socket 11 is covered by the dummy head for all relative positions of the head on the holder.

The counter-stop 31 is designed as a connecting rod which projects into the passage 30, and has a universal joint 32 by which the head 1 is pivotally connected to stop 31. For this purpose, an end 40 of the connecting rod projecting into the passage 30 is screwed into a bearing element 41 and is retained by a lock nut 42. The bearing element 41 is connected with the universal joint 32, the joint having two pivots 43, 44 which are arranged cross-wise relative to each other and whereof the pivot 44 is mounted at a carrier element 45 of the head 1. Pivot 43 forms a first axis extending between the sides of head 1, and pivot 44 forms a second axis extending between the neck and crown portion of the head. The carrier element 45 is constituted by the base of a cup 46 having wall portions extending from the rim (stops 23) of the passage 30 into the interior of the head 1. The pivot 44 is mounted on the side of the carrier element 45 facing the interior of the head 1. To make possible a pivoting or tilting movement of the head 1 relative to the connecting rod 31, the carrier element 45 is formed with an aperture 48.

Through the agency of its end 47 opposite the end 40, the connecting rod constituting the counter-stop 31 is screwed into a tightening nut 33 which is pivotal relative to the holder 2 and bears from the side remote from the socket 11 against an abutment 36 on the holder 2. On the side remote from the socket 11, the tightening nut 33 projects out of the holder 2. At this projecting end 34, the tightening nut is provided with a manipulating means 35 for rotating the nut on the connecting rod thereby to vary the extent of pressure engagement between the curved rear portion of head 1 and the curved socket 11. Arrnged between the abutment 36 and the tightening nut 33 is a compression spring 37, designed for example as a helical spring.

Figure 4:
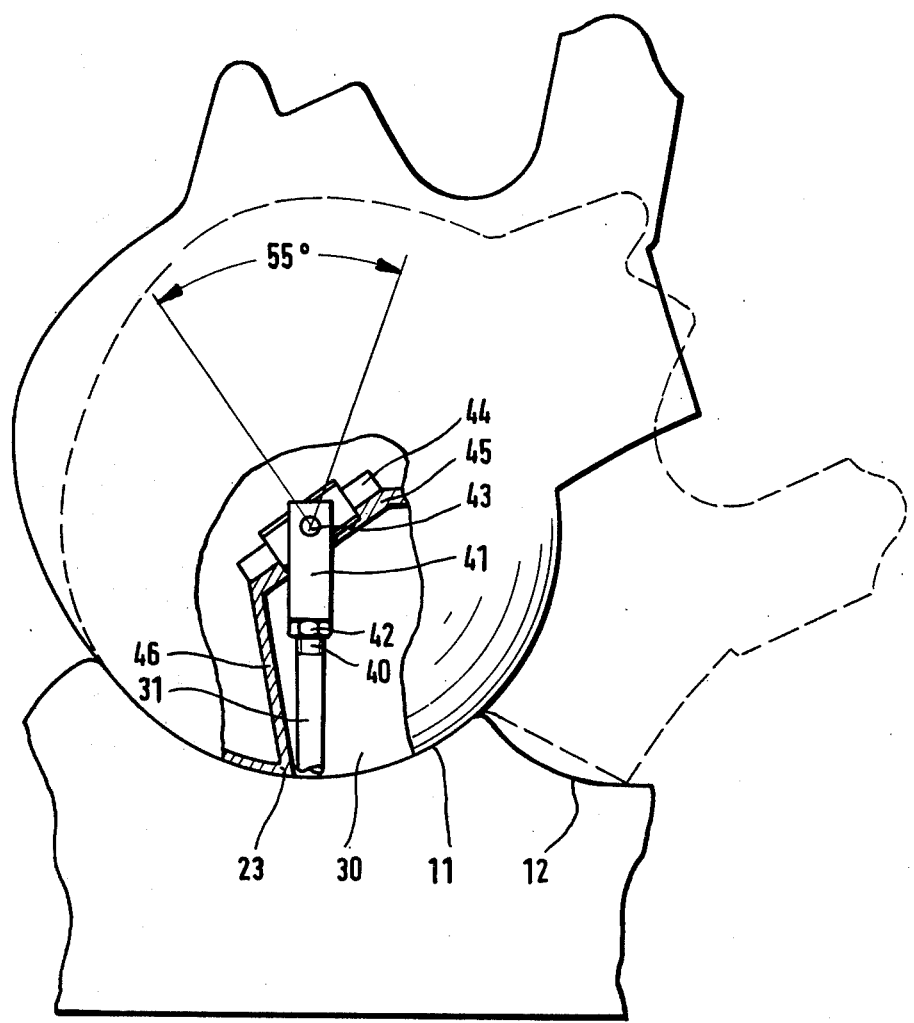
FIG. 4 illustrates the range of adjustment of the dummy head in the sense of a nodding movement.

As shown particularly in FIGS. 4 and 5, the stop 23 constituted by the rim of the passage 30 and the counter-stop 31 are so dimensioned and arranged that the maximum angle for movement of the head 1 in the sense of a nodding movement (about pivot 43) is approximately 55° and in the sense of lateral pivoting (about pivot 44) is approximately 60°. As FIG. 5 shows, the last-mentioned maximum angle of 60° is composed of two component angles i.e. a component angle of approximately 20° and a component angle of approximately 40°, each measured from the "straight-ahead-viewing" or median position towards the left (20°) and towards the right (40°). The position is similar with regard to FIG. 4 in the case of the first-mentioned maximum angle of 50°, related to the vertical line extending through the axis of the connecting rod 31.

For the reason mentioned hereinabove, in FIG. 2 the passage 30 is shown as being non-symmetrical, i.e. not concentric to the aperture 48 or to the connecting rod 31.

As will further be gathered from FIG. 2, the rim constituting the stop 23 is rounded between sections 38 delimiting the maximum angle of 60° and sections 39 delimiting the maximum angle of 55°.

I claim:

1. A dental teaching device comprising:
    a dummy head;
    a holder;
    and means mounting the dummy head displaceably on the holder whereby the dummy head can be adjusted to any desired position relative to the holder;
    wherein said means comprises a curved socket provided on said holder, and a curved rear portion of said dummy head, said rear portion engaging said curved socket so that adjustment of the relative position of the head on the holder can be carried out by relative sliding movement taking place between the curved socket and the curved rear portion;
    and wherein the curved socket is covered by the dummy head for all relative positions of the dummy head on the holder.

2. A dental teaching device comprising:
    a dummy head;
    a holder;
    a curved socket provided on the holder;

a curved rear portion of the dummy head in sliding engagement with said curved socket whereby the position of the head can be adjusted relative to holder by carrying out sliding movement between the curved rear portion and the curved socket;

and mutually interengageable limit stops provided on the curved socket and the curved rear portion for limiting the extent of adjustable movement of the head with respect to the holder.

3. A dental teaching device according to claim 2, including wall portions extending inwardly of said curved rear portion of the dummy head to define a passage therein, an outer rim of said wall portions defining an oening to said passage, and a stop element extending from said curved socket through said opening and into said passage, said rim and said stop element constituting said limit stops.

4. A dental teaching device according to claim 3, wherein said rim remains within the confines of said curved socket for all adjustable positions of the dummy head on the holder.

5. A dental teaching device according to claim 3, wherein said stop element interconnects the dummy head and the holder, said stop element comprising a connecting rod coupled with the dummy head via a universal joint.

6. A dental teaching device according to claim 5, including a nut rotatably mounted in said holder and in threaded engagement with said connecting rod, said nut having an end projecting through said holder in a direction away from said curved socket, and manipulating means coupled with said projecting end of the nut for adjusting the nut on the connecting rod thereby to vary the extent of pressure engagement between the curved rear portion of the head and the curved socket.

7. A dental teaching device according to claim 6, including an abutment provided in said holder, and a compression spring acting between said abutment and said nut in order to resist movement of the nut in a direction towards said curved socket.

8. A dental teaching device according to claim 5, wherein said universal joint defines a first pivot axis extending generally between the sides of the dummy head, and a second pivot axis extending generally between a neck portion and a crown portion of the dummy head, and wherein said interengageable limit stops permit adjustment of the dummy head about said first axis through an angle of up to approximately 55°.

9. A dental teaching device according to claim 5, wherein said universal joint defines a first pivot axis extending generally between the sides of the dummy head, and a second pivot axis extending generally between a neck portion and a crown portion of the dummy head, and wherein said interengageable limit stops permit adjustment of the dummy head about said second axis through an angle of up to approximately 60°.

10. A dental teaching device according to claim 9, wherein said dummy head has a median position with respect to said second axis, and wherein said dummy head is pivotable, from said median position, through 20° in one direction about said second axis and through 40° in an opposite direction about said second axis.

11. A dental teaching device according to claim 10, wherein said outer rim is generally rectangular as seen in plan view, one pair of sides extending in a direction between the sides of the dummy head and the other pair extending in a direction between the front and rear of the dummy head, and wherein adjacent sides of said rectangle are connected by rounded corners.

* * * * *